(12) United States Patent
Gonen

(10) Patent No.: US 8,602,298 B2
(45) Date of Patent: Dec. 10, 2013

(54) RECYCLING SYSTEM AND METHOD THEREOF

(75) Inventor: Ron Gonen, New York, NY (US)

(73) Assignee: Recyclebank, LLC, Philadelphia, PA (US)

( * ) Notice: Subject to any disclaimer, the term of this patent is extended or adjusted under 35 U.S.C. 154(b) by 627 days.

(21) Appl. No.: 12/041,461

(22) Filed: Mar. 3, 2008

(65) Prior Publication Data

US 2008/0169342 A1      Jul. 17, 2008

Related U.S. Application Data

(63) Continuation-in-part of application No. 11/854,387, filed on Sep. 12, 2007, which is a continuation-in-part of application No. 11/345,867, filed on Feb. 2, 2006, now Pat. No. 7,949,557.

(60) Provisional application No. 60/892,852, filed on Mar. 3, 2007, provisional application No. 60/825,383, filed on Sep. 12, 2006, provisional application No. 60/650,610, filed on Feb. 7, 2005.

(51) Int. Cl.
*G06K 5/00* (2006.01)

(52) U.S. Cl.
USPC ............................................. 235/380

(58) Field of Classification Search
USPC ............................................. 235/380
See application file for complete search history.

(56) References Cited

U.S. PATENT DOCUMENTS

| 4,248,334 A | 2/1981 | Hanley et al. |
| 4,949,528 A | 8/1990 | Palik |
| 5,035,564 A | 7/1991 | Matsumoto |

(Continued)

FOREIGN PATENT DOCUMENTS

| JP | 13-195496 | 7/2001 |
| JP | 2001-312551 | 9/2001 |

(Continued)

OTHER PUBLICATIONS

PCT/ISA/220, "Notification of Transmittal of the International Search Report . . .", for PCT/US2007/079440, mailed Apr. 23, 2008, (3 pgs).

(Continued)

*Primary Examiner* — Thien M Le
*Assistant Examiner* — Toan Ly
(74) *Attorney, Agent, or Firm* — John Maldjian, Esq.; Alexander D. Walter, Esq.; Kacvinsky Daisak PLLC

(57) ABSTRACT

A method of implementing an incentive-based recycling system is provided. In one embodiment of the present invention, the method of implementing an incentive-based recycling system includes dispatching a vehicle on a route, lifting a pickup cart comprising a volume of collectable recyclable material and having a radio frequency identification (RFID) readable tag disposed thereon, weighing the collectable recyclable material on a weighing device, using a radio frequency identification reader to obtain a unique set of identification data from the pickup cart, removing the pickup cart from the weighing device, transporting a volume of collectable recyclable material to a drop-off facility, validating collected weight data and identification data, uploading the data to a central database, generating at least one report from the data uploaded to the central database, and allocating rewards to a customer corresponding to a unique set of identification data.

17 Claims, 2 Drawing Sheets

(56) References Cited

U.S. PATENT DOCUMENTS

| | | | |
|---|---|---|---|
| 5,072,833 A | 12/1991 | Hansen et al. | |
| 5,209,312 A | 5/1993 | Jensen | |
| 5,209,361 A * | 5/1993 | Grubb, Jr. | 212/283 |
| 5,230,393 A | 7/1993 | Mezey | |
| 5,251,761 A | 10/1993 | Hansen et al. | |
| 5,304,744 A | 4/1994 | Jensen | |
| 5,333,984 A * | 8/1994 | Bayne et al. | 414/408 |
| 5,355,987 A | 10/1994 | DeWoolfson et al. | |
| 5,416,279 A | 5/1995 | Tseng | |
| 5,425,456 A | 6/1995 | Erickson | |
| 5,447,017 A | 9/1995 | Becher et al. | |
| 5,484,246 A | 1/1996 | Horning et al. | |
| 5,628,412 A | 5/1997 | Hulls | |
| 5,699,525 A | 12/1997 | Enbutsu et al. | |
| 5,704,558 A * | 1/1998 | Arrott | 241/47 |
| 5,712,990 A | 1/1998 | Henderson | |
| 5,833,429 A | 11/1998 | McNeilus et al. | |
| 5,837,945 A * | 11/1998 | Cornwell et al. | 177/136 |
| 5,842,652 A | 12/1998 | Warsing et al. | |
| 5,871,114 A | 2/1999 | Anderson et al. | |
| 5,923,016 A | 7/1999 | Fredregill et al. | |
| 5,934,867 A | 8/1999 | Christenson | |
| 5,960,402 A | 9/1999 | Embutsu et al. | |
| 5,965,858 A | 10/1999 | Suzuki et al. | |
| 5,983,198 A | 11/1999 | Mowery et al. | |
| 6,026,370 A | 2/2000 | Jermyn | |
| 6,055,573 A | 4/2000 | Gardenswartz et al. | |
| 6,292,785 B1 | 9/2001 | McEvoy et al. | |
| 6,448,898 B1 | 9/2002 | Kasik | |
| 6,496,804 B2 | 12/2002 | McEvoy et al. | |
| 6,663,004 B2 | 12/2003 | Wagner et al. | |
| 6,664,897 B2 * | 12/2003 | Pape et al. | 340/573.3 |
| 6,718,343 B2 | 4/2004 | Kamata | |
| 6,952,625 B2 | 10/2005 | Uetake et al. | |
| 6,993,712 B2 | 1/2006 | Ramachandran et al. | |
| 7,032,820 B2 | 4/2006 | Kreiner et al. | |
| 7,133,895 B1 | 11/2006 | Lee et al. | |
| 7,134,084 B1 | 11/2006 | Rashid et al. | |
| 7,136,865 B1 | 11/2006 | Ra et al. | |
| 7,167,836 B2 | 1/2007 | Gottslig et al. | |
| 7,251,620 B2 | 7/2007 | Walker et al. | |
| 7,267,262 B1 * | 9/2007 | Brown | 235/375 |
| 7,313,602 B2 | 12/2007 | Ono et al. | |
| 7,398,225 B2 | 7/2008 | Voltmer et al. | |
| 7,398,226 B2 | 7/2008 | Haines et al. | |
| 7,398,248 B2 | 7/2008 | Phillips et al. | |
| 7,424,441 B2 | 9/2008 | George et al. | |
| 7,428,498 B2 | 9/2008 | Voltmer et al. | |
| 7,496,524 B2 | 2/2009 | Voltmer et al. | |
| 7,689,682 B1 | 3/2010 | Eldering et al. | |
| 7,999,688 B2 | 8/2011 | Healey et al. | |
| 8,138,923 B2 | 3/2012 | Grunwald et al. | |
| 2002/0026326 A1 | 2/2002 | Stevens | |
| 2002/0040564 A1 * | 4/2002 | Killingbeck et al. | 53/416 |
| 2002/0082920 A1 | 6/2002 | Austin et al. | |
| 2002/0188509 A1 | 12/2002 | Ariff et al. | |
| 2003/0055723 A1 | 3/2003 | English | |
| 2003/0065610 A1 * | 4/2003 | Brown et al. | 705/37 |
| 2003/0115097 A1 | 6/2003 | Sokei et al. | |
| 2003/0139981 A1 | 7/2003 | Mizuno et al. | |
| 2003/0158818 A1 | 8/2003 | George et al. | |
| 2003/0233278 A1 | 12/2003 | Marshall | |
| 2004/0049424 A1 | 3/2004 | Murray et al. | |
| 2004/0083216 A1 * | 4/2004 | Kozam et al. | 707/10 |
| 2004/0143355 A1 | 7/2004 | Uetake et al. | |
| 2004/0167799 A1 * | 8/2004 | Berry | 705/1 |
| 2004/0199401 A1 * | 10/2004 | Wagner et al. | 705/1 |
| 2004/0199545 A1 | 10/2004 | Wagner et al. | |
| 2004/0200689 A1 | 10/2004 | Compton et al. | |
| 2004/0243468 A1 | 12/2004 | Cohagan et al. | |
| 2005/0027597 A1 | 2/2005 | Peterson | |
| 2005/0038572 A1 * | 2/2005 | Krupowicz | 700/305 |
| 2005/0043963 A1 | 2/2005 | Soga et al. | |
| 2005/0059849 A1 | 3/2005 | Liu | |
| 2005/0080520 A1 | 4/2005 | Kline et al. | |
| 2005/0131757 A1 | 6/2005 | Chan et al. | |
| 2005/0192963 A1 | 9/2005 | Tschiegg et al. | |
| 2005/0256767 A1 | 11/2005 | Friedman | |
| 2005/0267806 A1 | 12/2005 | Tano | |
| 2005/0273340 A1 | 12/2005 | Yamamoto | |
| 2006/0069588 A1 | 3/2006 | Ritter | |
| 2006/0080819 A1 | 4/2006 | McAllister | |
| 2006/0178933 A1 | 8/2006 | FitzGerald et al. | |
| 2006/0224450 A1 | 10/2006 | Moon | |
| 2006/0253407 A1 | 11/2006 | Waddell et al. | |
| 2006/0273180 A1 | 12/2006 | Ammond et al. | |
| 2007/0100694 A1 | 5/2007 | Kopps | |
| 2007/0102506 A1 | 5/2007 | Stevens | |
| 2007/0112632 A1 | 5/2007 | Voltmer et al. | |
| 2007/0174073 A1 | 7/2007 | Hunscher et al. | |
| 2007/0219862 A1 | 9/2007 | Casella et al. | |
| 2007/0260466 A1 | 11/2007 | Casella et al. | |
| 2007/0291323 A1 | 12/2007 | Roncal | |
| 2008/0061124 A1 | 3/2008 | Langlois et al. | |
| 2008/0061125 A1 | 3/2008 | Langlois et al. | |
| 2008/0069641 A1 | 3/2008 | Kreiner et al. | |
| 2008/0077498 A1 | 3/2008 | Ariff et al. | |
| 2008/0077499 A1 | 3/2008 | Ariff et al. | |
| 2008/0086411 A1 | 4/2008 | Olson et al. | |
| 2008/0169342 A1 | 7/2008 | Gonen et al. | |
| 2008/0183634 A1 | 7/2008 | Sadler | |
| 2008/0208721 A1 | 8/2008 | Bertogg | |
| 2008/0275772 A1 | 11/2008 | Suryanarayana et al. | |
| 2008/0320139 A1 | 12/2008 | Fukuda et al. | |
| 2009/0125402 A1 | 5/2009 | Voltmer et al. | |
| 2009/0132641 A1 | 5/2009 | Sanguinetti et al. | |
| 2009/0138358 A1 | 5/2009 | Gonen et al. | |
| 2009/0228406 A1 | 9/2009 | Lopez et al. | |

FOREIGN PATENT DOCUMENTS

| | | |
|---|---|---|
| JP | 2002073896 A | 3/2002 |
| JP | 2002-297840 | 10/2002 |
| JP | 2003-099520 | 4/2003 |
| JP | 2005-008339 | 1/2005 |
| KR | 10-20020084880 | 11/2002 |
| KR | 10-20080008694 | 1/2008 |
| KR | 10-20080013246 | 2/2008 |
| WO | 02096780 A3 | 12/2002 |

OTHER PUBLICATIONS

PCT/ISA/210, "International Search Report", for PCT/US2007/079440, mailed Apr. 23, 2008, (3 pgs).

PCT/ISA/237, "Written Opinion of the International Searching Authority", for PCT/US2007/079440, mailed Apr. 23, 2008, (5 pgs).

Form PCT/ISA/220, "Notification of Transmittal of the International Search Report", for PCT/US2008/055689, mailed Jul. 17, 2008, (3 pgs).

Form PCT/ISA/237, "Written Opinion of the International Searching Authority", for PCT/US2008/055689, mailed Jul. 17, 2008, (6 pgs).

Form PCT/ISA/210, "International Search Report", for PCT/US2008/055689, mailed Jul. 17, 2008, (3 pgs).

Form PCT/ISA/220, "Notification of Transmittal of the International Search Report . . .", Mailed Jun. 16, 2009 for PCT/US2009/031129, (4 Pgs).

From PCT/ISA/237, "Written Opinion of the International Searching Authority", Mailed Jun. 16, 2009 for PCT/US2009/031129, (6 Pgs).

Form PCT/ISA/210, "International Search Report", Mailed Jun. 16, 2009 for PCT/US2009/031129, (4 Pgs).

Intl' Search Report and Written Opinion for PCT/2008/055687 dated Aug. 20, 2008, 9 pages.

Int'l Search Report and Written Opinion for PCT/2009/042812 dated Dec. 21, 2009, 10 pages.

Int'l Search Report and Written Opinion for PCT/2010/021757 dated Aug. 31, 2010, 9 pages.

Int'l Search Report and Written Opinion for PCT/2010/025993 dated Oct. 29, 2010, 11 pages.

Int'l Search Report and Written Opinion for PCT/2009/042801 dated Nov. 30, 2009, 15 pages.

(56) References Cited

OTHER PUBLICATIONS

World Economic Forum Names RecycleBank a 2009 Technology Pioneer found at Http://Corporate. Recyclebank.com/press-release . . . Dec. 4, 2008 4 pages.
Peretsman, Natalie, "Rewarding Recycling," Scienceline, Jun. 12, 2008, (5 pgs).
Colimore, Edward, "Cherry Hill Starts Cashing in on Recycling," The Philadelphia Inquirer, Jun. 30, 2008, (2 pgs).
Hays, Julia, "Hauler: New Recycling Program Runs Smoothly," Courier-Post, Jul. 1, 2008, (2 pgs).
It's Easy Being Green: It Pays to Recycle, Center for American Progress, Jul. 16, 2008, (2 pgs).
Satullo, Chris, "The Right Kind of 'Nudge' Improves Life for Citizens," Tthe Philadelphia Inquirer, Jul. 20, 2008, (2 pgs).
Glick, Alexis, "Talking Trash.. Literally," The Glick Report, Fox Business, Jul. 31, 2008, (1 pg).
Judkis, Maura, "4 Ways to Earn Cash for Recycling," U.S. News & World Report, Jul. 30, 2008, (2 pgs).
Knoblauch, Jessica A., "Turning Your Trash Into Cash," Plenty Magazine, (3 pgs), Jul. 28, 2008.
Siegel, Robert, "What's Behind a Patchwork of Recycling Rules?" NPR, Jul. 28, 2008, (3 pgs).
Laidler, John, "Residents Find Recycling Has Its Just Reward," The Boston Globe, Jul. 27, 2008, (2 pgs).
Jones, Charisse, "Residents Reap Rewards for Recycling," USA Today, Jul. 9, 2008, (3 pgs).
Wong, Wylie, "Going Green," Biztech Magazine, Mar. 2008, found at http://www.biztechmagazine.com/article.asp?itemjd=397, (4 pgs.).
Walsh, Bryan, "Making Recycling Really Pay," Time Magazine, Apr. 11, 2008, found at http://www.time.com/time/health/article/0,8599,1730187,00.html?xid=rss-health, (2 pgs).
Gunther, Marc, "Turning Trash Into Cash," Fortune Magazine, Sep. 20, 2007, found at http://money.cnn.com/2007/09/20/magazines/fortune/recyciebankJortune/index.htm, (3 pgs).
"Bags to Riches," Good Magazine, Mar./Apr. 2007, (1 pg).
Desimone, Bonnie, "Rewarding Recyclers, and Finding Gold in the Garbage," The New York Times, Feb. 21, 2006, found at http://www.nytimes.com/2006/02/21/business/businessspecia1/21 recycle. html?_r=2&ore, (3 pgs).
4 Ways to Earn Cash for Recycling, US News and World Report, Jul. 31, 2008, (2 pgs).
Special Report: RecycleBank Set for the UK? Letsrecycle.com, Jul. 25, 2008, (4 pgs).
New 'American Scrap Coalition' Will Address Global Trade Barriers, Reuters, Jun. 12, 2008, (2 Pgs).
"Technology Pioneers 2009," World Economic Forum, (36 pgs).
Desai, Anuj et al., "The Plenty 20 Awards for 2008," (4 pgs).
Jenny Mero, "Wasteful Thinking" Fortune Magazine, Apr. 2008 (1 pg.).
Gonen, "EP Application No. EP08747881.4, European Search Report dated Mar. 18, 2011", Publisher: EPO, Published in: EP, 9 pages.
Wolff et al., "GB Application No. GB1104976.4, Examiner Report dated Oct. 21, 2011", Publisher: IPO.UK, Published in: GB, 2 pages.
"It's Easy Being Green: It Pays to Recycle," Center for American Progress, Jul. 16, 2008, (2 pgs).
Satullo, Chris, "The Right Kind of 'Nudge' Improves Life for Citizens," The Philadelphia Inquirer, Jul. 20, 2008, (2 pgs).
Glick, Alexis, "Talking Trash..Literally," The Glick Report, Fox Business, Jul. 31, 2008, (1 pg).
Wong, Wylie, "Going Green," Biztech Magazine, Mar. 2008, found at http://www.biztechmagazine.com/article.asp?item_id=397, (4 pgs.).
Walsh, Bryan, "Making Recycling Really Pay," Time Magazine, Apr. 11, 2008, found at http://www.time.com/time/health/article/0,8599,1730187,00.html?xid=rss-health, (2 pgs).
Gunther, Marc, "Turning Trash Into Cash," Fortune Magazine, Sep. 20, 2007, found at http://money.cnn.com/2007/09/20/magazines/fortune/recyclebank.fortune/index.htm, (3 pgs).
Desimone, Bonnie, "Rewarding Recyclers, and Finding Gold in the Garbage," The New York Times, Feb. 21, 2006, found at http://www.nytimes.com/2006/02/21/business/businessspecial/21recycle. html?_r=2&ore, (3 pgs).
"4 Ways to Earn Cash for Recycling," US News and World Report, Jul. 31, 2008, (2 pgs).
"Special Report: RecycleBank Set for the UK?" Letsrecycle.com, Jul. 25, 2008, (4 pgs).
"New 'American Scrap Coalition' Will Address Global Trade Barriers," Reuters, Jun. 12, 2008, (2 Pgs).
"Wasteful Thinking", Fortune Magazine, (1 pg), Apr. 21, 2008.
Int'l Search Report and Written Opinion dated Apr. 23, 2008, PCT/US2007/079440, 12 pages.

\* cited by examiner

RECYCLING SYSTEM AND METHOD THEREOF

CROSS-REFERENCE TO RELATED APPLICATIONS

This application is a continuation-in-part of U.S. patent application Ser. No. 11/854,387, filed Sep. 12, 2007, entitled "Method and System for Managing Recycling of Recyclable Material," which claims the benefit of U.S. Patent Application Ser. No. 60/825,383, filed Sep. 12, 2006. This application is also a continuation-in-part of U.S. patent application Ser. No. 11/345,867, filed Feb. 2, 2006, entitled "Method and System for Improving Recycling Through the Use of Financial Incentives," which claims the benefit of U.S. Patent Application Ser. No. 60/650,610, filed Feb. 7, 2005. This application claims the benefit of U.S. Patent Application Ser. No. 60/892,852, filed Mar. 3, 2007. This application also claims the benefit of U.S. Patent Application Ser. No. 60/892,849, filed Mar. 3, 2007. Each of the aforementioned applications is hereby incorporated by reference in its entirety.

BACKGROUND OF THE INVENTION

1. Field of the Invention

Embodiments of the present invention generally relate to a recycling system and method thereof. More specifically, embodiments of the present invention relate to a method of implementing an incentive-based recycling system which rewards clients for recycling recyclable goods via financial or other incentives.

2. Description of the Related Art

The recycling industry has become more and more active over the course of time, each year being more active than the last. Fueled by rising energy costs and diminishing supplies of natural resources, a great deal of time, money, and research has been put into the study of recycling processes, techniques, and methods. However, in order to install and conduct these recycling operations, the companies or individuals conducting these operations rely on a constant inflow of recyclable materials from environment-conscious consumers.

Currently, in the United States, a great deal of money is spent in setting up programs and facilities which attempt to encourage consumers to recycle recyclable material. However, these programs and facilities utilize simple persuasive techniques in order to convince consumers to recycle; that is, the programs fail to provide consumers with incentive to properly recycle recyclable materials. As such, much recyclable material, some of which is difficult or impossible to regenerate, such as aluminum, glass, and polymeric material, is being dumped into landfills, costing taxpayer money and the opportunity cost of saving energy by recycling.

Therefore, there is a need for a system of implementing an incentive-based recycling system.

SUMMARY OF THE INVENTION

Embodiments of the present invention generally relate to a recycling system and method thereof. More specifically, embodiments of the present invention relate to a method of implementing an incentive-based recycling system which rewards clients for recycling recyclable goods via financial or other incentives.

In one embodiment of the present invention, A method of implementing a system of incentive-based recycling comprises dispatching a vehicle on a route, lifting a pickup cart comprising a volume of collectable recyclable material and having a radio frequency identification (RFID) readable tag disposed thereon, weighing the collectable recyclable material on a weighing device, using a radio frequency identification reader to obtain a unique set of identification data from the pickup cart, removing the pickup cart from the weighing device, transporting a volume of collectable recyclable material to a drop-off facility, validating collected weight data and identification data, uploading the data to a central database, generating at least one report from the data uploaded to the central database, and allocating rewards to a customer corresponding to a unique set of identification data.

In another embodiment of the present invention, a system for providing an incentive-based recycling system comprises a mobile collection apparatus, a lifting device disposed on the mobile collection apparatus capable of lifting a pickup cart comprising a volume of collectable recyclable material and a radio frequency identification readable (RFID) tag, a weighing device disposed on the mobile collection apparatus, a radio frequency identification tag-reading device disposed on the mobile collection apparatus, and a storage receptacle for holding collectable recyclable material.

In yet another embodiment of the present invention, A method of implementing a system of incentive-based recycling comprises dispatching a vehicle on a route, lifting with a lifting device a pickup cart comprising a volume of collectable recyclable material, a graspable bar, and an active radio frequency identification readable tag, placing the pickup cart containing a volume of collectable recyclable material on a scale, obtaining a gross weight for the pickup cart containing a volume of collectable recyclable material, transferring the collectable recyclable material into an on-board storage receptacle, obtaining a tare weight for the pickup cart, calculating a net weight of the collectable recyclable material, using a radio frequency identification reader to obtain a unique set of identification data, removing the pickup cart from the scale, transporting a volume of collectable recyclable material to a drop-off facility, validating collected weight data and identification data, uploading the data to a central database, generating at least one report from the data uploaded to the central database, and allocating financial rewards to a customer corresponding to a unique set of identification data.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
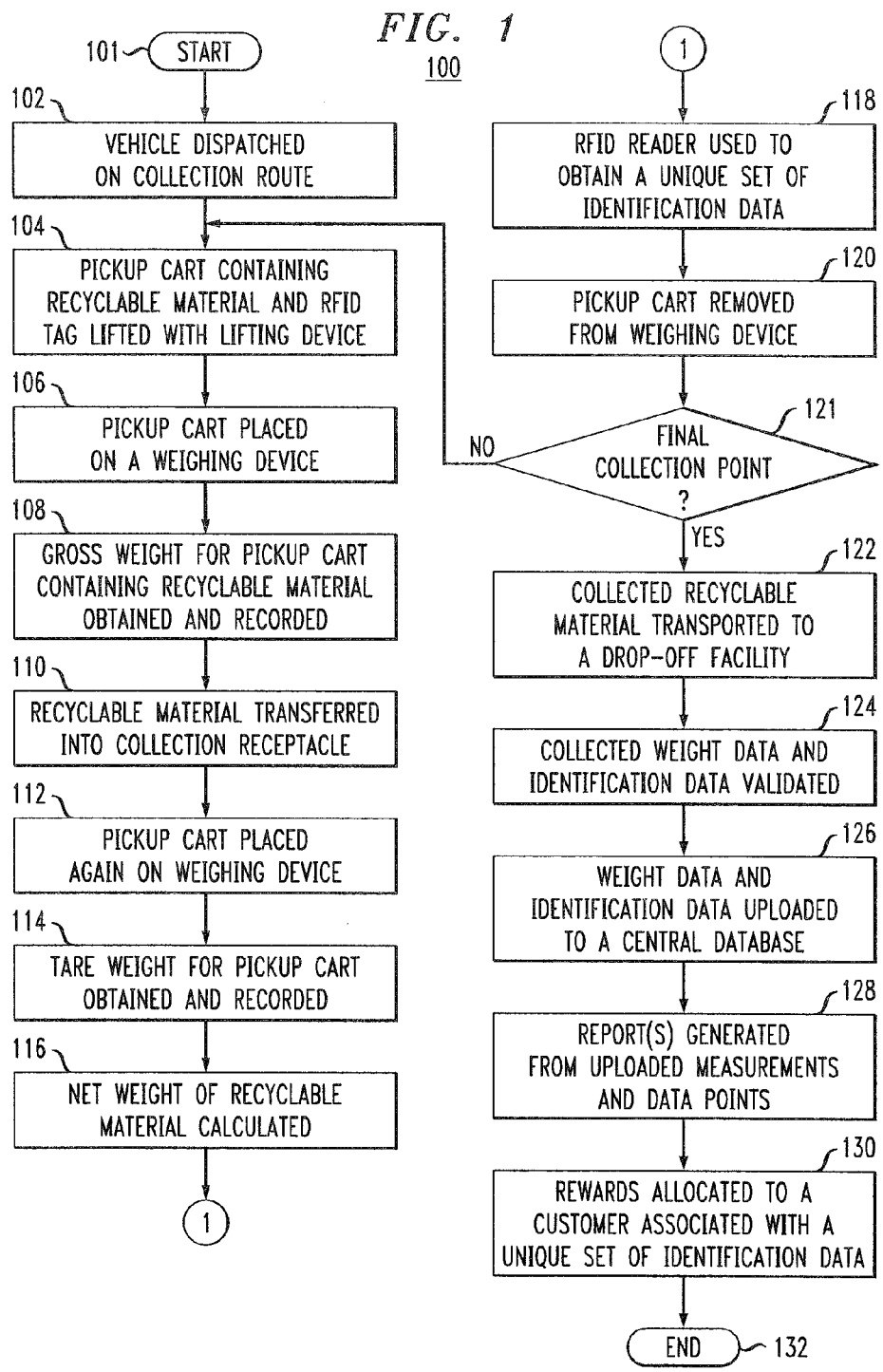
FIG. 1 depicts a flowchart illustrating an exemplary method in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the drawings.

DETAILED DESCRIPTION OF THE INVENTION

Embodiments of the present invention generally relate to a recycling system and method thereof. More specifically, embodiments of the present invention relate to a method of implementing an incentive-based recycling system which rewards clients for recycling recyclable goods via financial or other incentives.

As used herein, the term "recyclable material" refers to any material which can be processed, treated, or otherwise altered in order to recover spent, used, or deteriorated material. "Recyclable material" may include, but is not limited to, metal, glass, plastics, polymers, paper, cardboard, batteries, oil, tires, textiles, timber, concrete, and any other recyclable material which is feasible in the context of the present invention.

As used herein, the term "record" and any derivative term thereof (i.e., "records," "recording," "recordable," "recordation," etc.) refers to any manner of logging data points. Recordation may be physical (e.g., written down using a writing implement in conjunction with paper), electronic (e.g., entering data into a database), or by any other method feasible in the context of the present invention.

As used herein, the term "database" may refer to any organized collection of data and/or any method of collecting such data. A database may take the form of a physical organization of data (e.g., a written document), an electronic organization of data (e.g., a computer database such as Microsoft Access), or any other organizational system feasible in the context of the present invention.

As used herein, the term "download" and any derivative term thereof (i.e., "downloads," "downloading," "downloadable," etc.) refers to the act, or the product, of receiving a set of data from a database. Additionally, as used herein, the term "upload" and any derivative thereof (i.e., "uploads," "uploading," "uploadable," etc.) refers to the act, or the product, of sending a set of data to a database.

Figure 2:
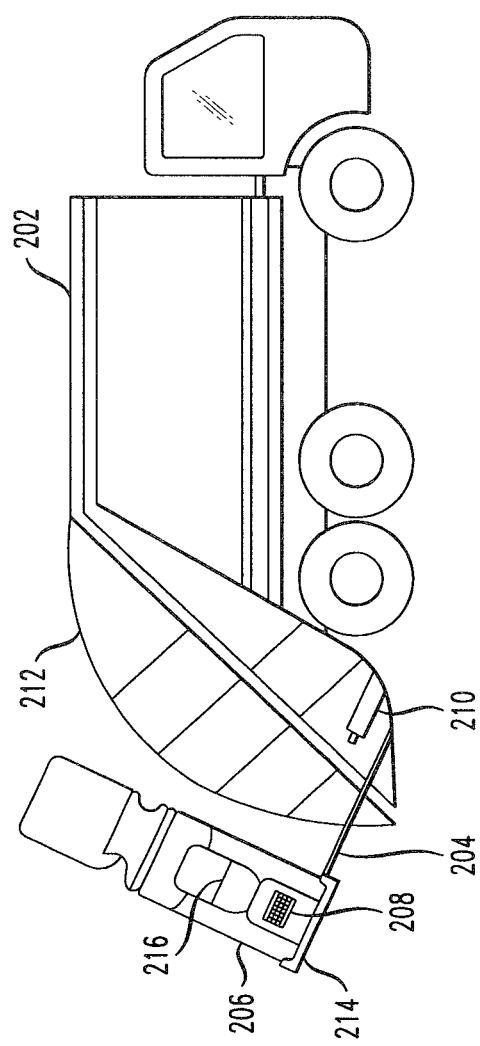
FIG. 2 depicts a portion of an incentive-based recycling system in accordance with one embodiment of the present invention.

FIG. 1 depicts a flowchart illustrating an exemplary method in accordance with one embodiment of the present invention. FIG. 2 depicts a portion of an incentive-based recycling system in accordance with one embodiment of the present invention. As discussed herein, reference may be made between both FIGS. 1 and 2, whereas the former represents exemplary method steps provided by novel embodiments of the present invention, and the latter depicts an exemplary system in which such novel embodiments are implemented.

The method 100 begins at step 101. In one embodiment, at step 102, a vehicle 202 adapted for collection of recyclable materials is dispatched on a predetermined, planned route. The vehicle 202 may be any vehicle suitable for embodiments of the present invention. In many embodiments, the vehicle has been adapted for collection, optionally featuring such components as a storage bin, compactor, fork, shovel, scoop, or any other component suitable for embodiments of the present invention or any combination thereof. One exemplary type of vehicle is a "garbage truck," such as the type disclosed by U.S. Pat. No. 4,242,311, which is incorporated herein by reference in its entirety.

Along the route, the vehicle 202 stops at a series of collection points to collect recyclable material. The collection points may comprise residences, places of business, farms, or any other location feasible in the context of the present invention. At each collection point, the vehicle 202 collects a volume of recyclable material to be transported to a recycling facility, treatment plant, or other such processing facility.

In one embodiment, the vehicle 202 is equipped with a lifting device 204, such as an elevator, a lifting arm, or any other such means for lifting feasible in the context of the present invention. In one embodiment, the lifting device is a rotary actuator lifter. In one embodiment, a lifting device is commercially available from Cascade Engineering, Inc. of Grand Rapids, Mich. under the CTB designation. In another embodiment, a lifting device is commercially available from Barker Products of Greenville, S.C. under the BPH15 designation.

At step 104, the lifting device 204 lifts a pickup cart 206 containing a volume of collectable recyclable material. At step 106, the cart 206 is placed onto a weighing device 214. The weighing device 214 may be a scale, a balance, or any other weighing device feasible in the context of the present invention. The weighing device 214 may operate in a digital or analog manner. One exemplary weighing and lifting device is disclosed in U.S. Pat. No. 5,119,894, issued Jun. 9, 1992 to Crawford et al., the entirety of which is hereby incorporated herein by reference. At step 108, once the pickup cart 206 containing collectable recyclable material is placed on the weighing device, the gross weight—that is, the weight of the pickup cart 206 and the collectable recyclable material—is obtained and recorded.

The pickup cart 206 may comprise a storage bin, a trash can, a mobile garbage bin (such as those sold under the Dumpster® trademark), or any other waste receptacle feasible in the context of the present invention. In one embodiment of the present invention, the pickup cart 206 comprises a trash storage bin having a bar 216 disposed thereon, which the lifting device is able to grasp, thereby enabling the lifting device 204 to effectively maneuver the bin.

In many embodiments of the present invention, pickup carts 206 are equipped with radio frequency identification (RFID) tags 208. In such embodiments, pickup cart 206 comprises at least a RFID tag 208, each being programmed with a unique identification value. The RFID tag 208 may be passive, active, or semi-passive. In one embodiment of the present invention, the RFID tag 208 is active.

In step 110, after the gross weight of the pickup cart 206 and the collectable recyclable material is obtained and recorded, the recyclable material is transferred to a storage receptacle 212 for ease of transport. In one embodiment of the present invention, the storage receptacle 212 is located on-board the vehicle. In another embodiment of the present invention, the storage receptacle 212 is a generally stationary storage receptacle, such as a garbage bin. Optionally, the storage receptacle 212 serves as a temporary holding area for recyclable material collected during a route.

At step 112, once the recyclable material has been emptied into the storage receptacle 212, the lifting device 204 replaces the pickup cart 206, now empty of collectable recyclable material, onto the weighing device 214. At step 114, the weighing device 214 calculates the tare weight—that is, the weight of the pickup cart 206 which is free of collectable recyclable material—and records this value. At step 116, in one embodiment of the present invention, the tare weight can then be subtracted from the gross weight to determine the net weight of the collectable recyclable material obtained from each collection point.

At step 118, in one embodiment, a radio frequency identification (RFID) tag reader 210 reads a passive RFID tag 208 on the pickup cart 206 to obtain a unique identification value corresponding to a customer. In one embodiment, the unique identification value is a 16-digit numerical value. The unique identification value can then be recorded in a database. Other data may also be obtained from the collection point which is then associated with a unique identification value.

At step 120, the pickup cart 206 is then removed from the weighing device 214 and replaced to its original position. The collectable recyclable material may then be transported to a recycling facility or other processing or treatment facility feasible in the context of the present invention.

In many embodiments of the present invention, after the recyclable material is collected by the vehicle from a collection point, the vehicle 202 may continue to visit additional collection points along the route. Generally, once the material from the final collection point has been collected, or once the storage receptacle 212 becomes full of recyclable material, the vehicle 202 enters a drop-off facility, where it can unload the recyclable material for further processing, as shown at decision 121.

In one embodiment of the present invention, the measurements and other data points collected by the vehicle or data collection system are then validated, at step 124. In one embodiment of the present invention, if necessary, the validation process first converts the raw data collected along the route to a format which is readable by a central database system. Then, the validation process ensures that there are no duplicate points and no incomplete points (that is, points with data missing in required fields). If any duplicate or incomplete points exist, the validation process removes these points from the data series.

In many embodiments of the present invention, after the recyclable material is collected by the vehicle from a collection point, the vehicle 202 may continue to visit additional collection points along the route. Generally, once the material from the final collection point has been collected, or once the storage receptacle 212 becomes full of recyclable material, as shown at decision 121, the vehicle 202 enters a drop-off facility, where it can unload the recyclable material for further processing 122.

At step 128, when the data has been uploaded to the central database, at least one report is generated from the uploaded data, in accordance with one embodiment of the present invention. The at least one report may present the data points and/or analysis of such points. The at least one report may include all or some of the data points and measurements uploaded to the central database.

In one embodiment of the present invention, the report or reports may include a plurality of measurements and data, such as RFID identification value, date of collection, time of collection, gross weight, tare weight, net weight, level indicator, contamination indicator, scale identification value, sequence identification value, and any other measurement or value feasible in the context of the present invention. Any of these values may be input manually or generated automatically by one or more data enterers.

At step 130, a set of rewards is allocated to a customer or client associated with a unique set of identification data collected from a collection point. The rewards may be financial in nature (e.g., monetary rewards) or any other type of rewards feasible in the context of the present invention. In an embodiment of the present invention, rewards may comprise cash. In another embodiment, the rewards may comprise a credit, such as a gift certificate. In another embodiment, the rewards may comprise points or tokens which are redeemable for financial rewards.

The rewards may be allocated electronically (e.g., a transaction between two bank accounts, an entry into an electronic database), physically (e.g., a check or money order, a certificate), or by any other type of method feasible in the context of the present invention.

In one embodiment of the present invention, rewards are allocated to a customer in an amount which is proportionate to the amount of recyclable material collected from a collection point associated with that customer. In such an embodiment, the amount of rewards allocated to any customer or client may be calculated or otherwise determined using an algorithm. The algorithm may take as input any of the measurements made or data points recorded before, during, or after collection of recyclable material from collection points. The output of the algorithm may be a specific currency amount, an amount of points or tokens, a credit amount, any other output feasible in the context of the present invention, or any combination thereof.

In another embodiment of the present invention, rewards are allocated to a customer in a fixed amount. In such an embodiment, the central database may be queried to determine if a vehicle collected recyclable material from a collection point corresponding to a customer. If so, the customer may be credited with a fixed amount of currency, points, tokens, or any other reward type feasible in the context of the present invention, hereinafter referred to as "units." In another embodiment, a customer may be credited with a fixed amount of units regardless of the collection of recyclable material.

In another embodiment of the present invention, rewards are allocated to a customer in an amount based on the total amount of recyclable material collected from a series of collection points. In one embodiment, each of a series of customers, each corresponding to one or more collection points, may be allocated a fixed amount of units. In another embodiment, each of a series of customers, corresponding to one or more collection points, may be allocated an amount of units which is proportionate to the amount of recyclable material collected at the collection point or collection points which correspond to the customer. In another embodiment, each of a series of customers, corresponding to one or more collection points, may be allocated an amount of units based on an algorithmic calculation, as described above. The method 100 ends at step 132.

While the foregoing is directed to embodiments of the present invention, other and further embodiments of the invention may be devised without departing from the basic scope thereof.

What is claimed is:

1. A method of implementing a system of incentive-based recycling comprising:
   dispatching a vehicle on a route having a series of collection points to collect recyclable material;
   lifting, with a lifting device, a pickup cart comprising (i) a volume of collectable recyclable material and (ii) a radio frequency identification (RFID) readable tag disposed on the pickup cart;
   weighing the collectable recyclable material on a weighing device;
   transferring the collectable recyclable material into a storage receptacle;
   using a radio frequency identification reader to obtain a unique set of identification data from the pickup cart;
   removing the pickup cart from the weighing device;
   transporting a volume of collectable recyclable material to a drop-off facility;

validating collected weight data and identification data; wherein the validating comprises removing duplicate and incomplete points in the collected weight data and identification data, wherein the data is selected from a group consisting of: identification data obtained from each collection point, the amount of recyclable material collected at each collection point, and the amount of rewards to be allocated for each collection point;

uploading the data to a central database;

generating at least one report from the data uploaded to the central database; and allocating rewards as incentives to a customer corresponding to the unique set of identification data based on total amount of recyclable material collected from the series of collection points, in order to implement an incentive-based recycling system.

2. The method of claim 1, wherein the weighing device comprises a scale.

3. The method of claim 1, wherein the lifting device comprises a rotary actuator lifter.

4. The method of claim 1, wherein the storage receptacle is located on-board the vehicle.

5. The method of claim 1, wherein the pickup cart comprises a lid for securing the recyclable materials in a volume therein.

6. The method of claim 1, wherein the RFID tag is a passive RFID tag.

7. The method of claim 1, wherein a unique identification data programmed on the RFID tag is a 16-digit numerical value.

8. The method of claim 1, wherein the rewards allocated are financial rewards.

9. The method of claim 1, wherein the at least one report comprises at least one of radio frequency identification value, date of collection, time of collection, gross weight, tare weight, net weight, level indicator, contamination indicator, scale identification value, sequence identification value, or any combination thereof.

10. The method of claim 1, wherein rewards are allocated to a customer in an amount equal to at least one of a proportionate value to the amount of recyclable material collected from a collection point associated with that customer, or a fixed amount.

11. The method of claim 1, wherein the validating comprises converting raw data collected along the route to a format readable by the central database.

12. A system for providing an incentive-based recycling system comprising:

a mobile collection apparatus to collect recyclable material from a series of collection points;

a lifting device disposed on the mobile collection apparatus capable of lifting a pickup cart comprising a volume of collectable recyclable material and a radio frequency identification readable (RFID) tag, wherein the radio frequency identification readable tag is disposed on the pickup cart;

a weighing device disposed on the mobile collection apparatus and configured to produce a measured weight of collectable recyclable material, wherein the measured weight of collectable recyclable material is used to calculate an incentive;

a radio frequency identification tag-reading device disposed on the mobile collection apparatus to obtain a unique set of identification data from the pickup cart;

a storage receptacle for holding collectable recyclable material;

a validation module for validating collected weight data and identification data; wherein the validation module comprises removing duplicate and incomplete points in the collected weight data and identification data, wherein the data is selected from a group consisting of: identification data obtained from each collection point, the amount of recyclable material collected at each collection point, and the amount of rewards to be allocated for each collection point; and a central database system configured to allocate rewards as incentives to a customer corresponding to the unique set of identification data based on total amount of recyclable material collected from the series of collection points;

wherein the mobile collection apparatus, the lifting device, the weighing device, the radio frequency identification tag-reading device, the storage receptacle, and the central database system comprise the incentive-based recycling system.

13. The system of claim 12, wherein the weighing device is a scale.

14. The system of claim 12, wherein the lifting device and the weighing device comprise a single unit.

15. A method of implementing a system of incentive-based recycling comprising:

dispatching a vehicle on a route having a series of collection points to collect recyclable material;

lifting with a lifting device a pickup cart comprising a volume of collectable recyclable material, a graspable bar, and an active radio frequency identification readable tag;

placing the pickup cart containing a volume of collectable recyclable material on a scale;

obtaining a gross weight for the pickup cart containing a volume of collectable recyclable material;

transferring the collectable recyclable material into an on-board storage receptacle;

obtaining a tare weight for the pickup cart;

calculating a net weight of the collectable recyclable material;

using a radio frequency identification reader to obtain a unique set of identification data;

removing the pickup cart from the scale;

transporting a volume of collectable recyclable material to a drop-off facility;

validating collected weight data and identification data; validating collected weight data and identification data; wherein the validating comprises removing duplicate and incomplete points in the collected weight data and identification data, wherein the data is selected from a group consisting of: identification data obtained from each collection point, the amount of recyclable material collected at each collection point, and the amount of rewards to be allocated for each collection point uploading the data to a central database;

generating at least one report from the data uploaded to the central database; and allocating financial rewards as incentives to a customer corresponding to a unique set of identification data based on total amount of recyclable material collected from the series of collection points, in order to implement an incentive-based recycling system.

16. The method of claim 15, wherein the at least one report comprises at least one of radio frequency identification value, date of collection, time of collection, gross weight, tare weight, net weight, level indicator, contamination indicator, scale identification value, sequence identification value, or any combination thereof.

17. The method of claim 15, wherein rewards are allocated to a customer in an amount equal to at least one of a proportionate value to the amount of recyclable material collected from a collection point associated with that customer, or a fixed amount.

\* \* \* \* \*